(12) United States Patent
Grant (10) Patent No.: US 12,305,354 B2
(45) Date of Patent: May 20, 2025

(54) METHOD OF RETROFITTING AN EXCAVATOR WITH A TILTROTOR USING A SPLIT CONNECTOR

(71) Applicant: Caterpillar Work Tools B.V., s-Hertogenbosch (NL)

(72) Inventor: Patrick Grant, Tilburg (NL)

(73) Assignee: Caterpillar Work Tools B.V., s-Hertogenbosch (NL)

( * ) Notice: Subject to any disclaimer, the term of this patent is extended or adjusted under 35 U.S.C. 154(b) by 955 days.

(21) Appl. No.: 17/397,622

(22) Filed: Aug. 9, 2021

(65) Prior Publication Data

US 2021/0363724 A1 Nov. 25, 2021

Related U.S. Application Data

(62) Division of application No. 16/126,972, filed on Sep. 10, 2018, now abandoned.

(51) Int. Cl.
*E02F 3/36* (2006.01)
*B60R 16/02* (2006.01)
*E02F 3/28* (2006.01)

(52) U.S. Cl.
CPC ........ *E02F 3/3681* (2013.01); *B60R 16/0215* (2013.01); *E02F 3/283* (2013.01); *E02F 3/3654* (2013.01); *B60Y 2200/412* (2013.01)

(58) Field of Classification Search
CPC ............. B60R 16/0207; B60R 16/0215; E02F 9/0858; E02F 3/3681; E02F 3/3654; E02F 3/283; B60Y 2200/412
See application file for complete search history.

(56) References Cited

U.S. PATENT DOCUMENTS 4,942,499 A * 7/1990 Shibata ............... B60R 16/0239
361/825
5,529,515 A * 6/1996 Ohtaka ............... H01R 13/4365
29/733
(Continued)

FOREIGN PATENT DOCUMENTS

CN 102959158 3/2013
CN 103052589 4/2013
(Continued)

OTHER PUBLICATIONS

"U.S. Appl. No. 16/126,972, Non Final Office Action mailed Jul. 27, 2020", 6 pgs.
(Continued)

*Primary Examiner* — Adam J Behrens (57) ABSTRACT

A method of retrofitting an excavator to add a tiltrotator can include installing a tiltrotator on a stick and a bucket of the excavator, where the tiltrotator can include a tiltrotator wiring connector. An existing external machine connector can be disconnected from a first connector block on an outside cabin wall of the excavator. A first external connector of a first external branch of an external wiring harness can be connected to the first connector block on the outside of the cabin wall. A second external connector of a second external branch of the external wiring harness can be connected to an external machine connector of the excavator, where the second external branch can be connected to the first external branch. A third external connector of a third external branch of the external wiring harness can be connected to the tiltrotator wiring connector.

20 Claims, 7 Drawing Sheets

(56) References Cited

U.S. PATENT DOCUMENTS

| | | | | |
|---|---|---|---|---|
| 5,610,447 | A | * | 3/1997 | Nishikawa .............. H01R 31/08 |
| | | | | 174/72 A |
| 5,661,453 | A | * | 8/1997 | Justus ................. B60R 16/0215 |
| | | | | 340/457.1 |
| 5,745,795 | A | | 4/1998 | Pecone et al. |
| 5,857,863 | A | * | 1/1999 | Onizuka .............. B60R 16/0207 |
| | | | | 439/364 |
| 6,330,746 | B1 | * | 12/2001 | Uchiyama ........... B60R 16/0207 |
| | | | | 29/760 |
| 6,550,571 | B1 | * | 4/2003 | Kimura ................... E02F 9/163 |
| | | | | 181/207 |
| 6,923,285 | B1 | * | 8/2005 | Rossow .................. E02F 3/431 |
| | | | | 701/50 |
| 7,030,514 | B2 | | 4/2006 | Wareham et al. |
| 7,114,998 | B2 | | 10/2006 | Ishikawa et al. |
| 8,397,203 | B2 | * | 3/2013 | Tsuchiya ................ G06F 30/15 |
| | | | | 700/98 |
| 8,414,051 | B2 | * | 4/2013 | Nakayoshi .......... B60R 16/0239 |
| | | | | 220/531 |
| 8,469,734 | B2 | | 6/2013 | Chen |
| 9,551,366 | B2 | * | 1/2017 | O'Donnell ............. B60K 25/06 |
| 9,672,959 | B2 | * | 6/2017 | Sakaki ................. B60R 16/0207 |
| 2003/0197420 | A1 | * | 10/2003 | Burton .................. E02F 3/3414 |
| | | | | 299/39.5 |
| 2009/0171482 | A1 | * | 7/2009 | Mindeman ......... G05B 19/0426 |
| | | | | 700/83 |
| 2010/0092233 | A1 | * | 4/2010 | Roan ..................... E02F 9/2275 |
| | | | | 403/14 |
| 2012/0306195 | A1 | * | 12/2012 | Fowkes ................. E02F 9/2275 |
| | | | | 29/428 |
| 2014/0021781 | A1 | * | 1/2014 | Satake .................. E02F 9/0866 |
| | | | | 307/9.1 |
| 2014/0368977 | A1 | | 12/2014 | Lenny |
| 2016/0111878 | A1 | | 4/2016 | Qureshi et al. |
| 2016/0145832 | A1 | * | 5/2016 | Stockhaus ................ E02F 3/32 |
| | | | | 414/815 |
| 2017/0275851 | A1 | * | 9/2017 | Huber ................... E02F 9/2004 |

FOREIGN PATENT DOCUMENTS

| | | | |
|---|---|---|---|
| CN | 203543854 | 4/2014 | |
| CN | 204088824 | 1/2015 | |
| CN | 103235372 | 3/2015 | |
| CN | 205231429 | 5/2016 | |
| DE | 4319832 | 1/1994 | |
| KR | 200429128 | 10/2006 | |
| WO | 2011142704 | 11/2011 | |
| WO | 2017203107 | 11/2017 | |
| WO | 2018153934 | 8/2018 | |
| WO | WO-2019192669 A1 * | 10/2019 | .............. B60L 1/003 |

OTHER PUBLICATIONS

"LaCro", [Online] Retrieved from the internet:https: web.archive.org web 20030719190102 http: www.lacroproducts.com , (Jul. 19, 2003), 1 page.

"U.S. Appl. No. 16/126,972, Response filed Oct. 23, 2020 to Non Final Office Action mailed Jul. 27, 2020", 11 pgs.

"U.S. Appl. No. 16/126,972, Non Final Office Action mailed Dec. 4, 2020", 9 pgs.

"U.S. Appl. No. 16/126,972, Response filed Feb. 12, 2021 to Non Final Office Action mailed Dec. 4, 2020", 13 pgs.

"U.S. Appl. No. 16/126,972, Final Office Action mailed Apr. 14, 2021", 9 pgs.

"U.S. Appl. No. 16/126,972, Response filed Jul. 14, 2021 to Final Office Action mailed Apr. 14, 2021", 12 pgs.

"U.S. Appl. No. 16/126,972, Advisory Action mailed Jul. 28, 2021", 3 pgs.

* cited by examiner

METHOD OF RETROFITTING AN EXCAVATOR WITH A TILTROTOR USING A SPLIT CONNECTOR

CROSS-REFERENCE TO RELATED APPLICATION

This application is a division of U.S. patent application Ser. No. 16/126,972, filed Sep. 10, 2018, which is incorporated by reference herein in its entirety.

TECHNICAL FIELD

This disclosure relates generally, but not by way of limitation, to wiring components for heavy equipment. More particularly, this disclosure relates to wiring components for excavators.

BACKGROUND

Excavators and other hydraulic equipment can use a boom, stick, and bucket to move dirt and/or other construction materials using controls positioned within a cabin of the equipment. Some equipment, such as excavators, can be modified to include a tiltrotator between the stick and the bucket. The tiltrotator can add additional degrees of freedom over a traditional bucket, allowing an operator of the excavator to perform additional tasks. In some cases, existing excavators may be modified to add a tiltrotator.

SUMMARY OF THE INVENTION

To summarize at least a portion of the disclosure, a non-limiting list of examples is provided here:

Example 1 is a wiring assembly for an excavator, the wiring assembly comprising: a first wiring harness comprising: a first branch including a first connector couplable to a machine connector block affixed to the excavator; and a second branch connected to the first connector, the second branch including a second connector couplable to a first machine connector of the excavator; and a second wiring harness comprising: a third branch including a third connector couplable to the machine connector block to connect to the first connector; a fourth branch connected to the third connector, the fourth branch including a fourth connector couplable to a second machine connector of the excavator; and a fifth branch connected to the third connector, the fifth branch including a fifth connector couplable to a tiltrotator connector of a tiltrotator of the excavator.

In Example 2, the subject matter of Example 1 optionally includes wherein the second wiring harness further comprises a sixth branch connected to the third connector and including a sixth connector couplable to an electronic controller.

In Example 3, the subject matter of any one or more of Examples 1-2 optionally include wherein the second wiring harness further comprises a seventh branch connected to the third connector and including a seventh connector and an eighth branch connected to the third connector and including an eighth connector, each of the seventh connector and the eighth connector couplable to quick coupler valve.

In Example 4, the subject matter of any one or more of Examples 1-3 optionally include wherein the first wiring harness further comprises a ninth branch connected to the first connector and including a ninth connector couplable to an electronic machine controller.

In Example 5, the subject matter of Example 4 optionally includes wherein the first wiring harness further comprises a tenth branch connected to the first connector and including a tenth connector couplable to a steering device of the tiltrotator.

In Example 6, the subject matter of Example 5 optionally includes wherein the second wiring harness further comprises an eleventh branch connected to the first connector and including an eleventh connector couplable to a shut off lever.

In Example 7, the subject matter of any one or more of Examples 1-6 optionally include wherein the first connector is a male multi-pole connector and the second connector is a female multi-pole connector.

In Example 8, the subject matter of any one or more of Examples 1-7 optionally include wherein the third connector is a male multi-pole connector and the fourth connector is a female multi-pole connector.

Example 9 is an excavator comprising: a body supporting a boom, a stick, and a bucket each powered to move relative to the body; a cabin supported by the body and configured to enclose an operator therein, the cabin including a cabin wall; a tiltrotator coupled to the stick and the bucket, the tiltrotator operable to tilt, rotate, and curl the bucket relative to the stick, the tiltrotator including a wiring connector; and an external harness comprising: a first external cable including a first external connector and a second external connector, the first external connector couplable to the connector block on an outside of the cabin wall of the excavator, and the second external connector couplable to an external machine connector of the excavator; and a second external cable connected to the first external connector and including a third external connector couplable to the wiring connector of the tiltrotator.

In Example 10, the subject matter of Example 9 optionally includes wherein the external harness further comprises a third external cable connected to the first external connector and including a fourth external connector couplable to an electronic controller.

In Example 11, the subject matter of any one or more of Examples 9-10 optionally include wherein the external harness further comprises a fourth external cable connected to the first external connector and including a fifth external connector and a sixth external connector each couplable to quick coupler valve.

In Example 12, the subject matter of any one or more of Examples 9-11 optionally include an internal wiring harness comprising: a first internal cable including a first internal connector couplable to a connector block located on an inside of the cabin wall of the excavator; and a second internal cable connected to the first internal connector, the second cable including a second internal connector couplable to an internal machine connector of the excavator.

In Example 13, the subject matter of Example 12 optionally includes wherein the internal harness further comprises a third internal cable connected to the first internal connector and including a third internal connector couplable to an electronic machine controller.

In Example 14, the subject matter of Example 13 optionally includes wherein the internal harness further comprises a fourth internal cable connected to the first internal connector and including a fourth internal connector couplable to a steering device of the tiltrotator, and wherein the internal harness further comprises a fifth internal cable connected to the first internal connector and including a fifth internal connector couplable to a shut off lever.

In Example 15, the subject matter of any one or more of Examples 10-14 optionally include wherein the first internal connector is a male multi-pole connector and the second internal connector is a female multi-pole connector, and wherein the first external connector is a male multi-pole connector and the second external connector is a female multi-pole connector.

In Example 16, the subject matter of any one or more of Examples 9-15 optionally include a set of tracks connected to the body and operable to move the body relative to a ground surface; a motor coupled to the tracks and supported by the body, the motor configured to drive the tracks to rotate; and a hydraulic pump powered by the motor and operable to provide hydraulic fluid pressure.

Example 17 is a method of retrofitting an excavator to add a tiltrotator, the method comprising: installing a tiltrotator on a stick and a bucket of the excavator, the tiltrotator including a tiltrotator wiring connector; disconnecting an existing external machine connector from a connector block on an outside cabin wall of the excavator; connecting a first external connector of a first external branch of an external wiring harness to the connector block on the outside of the cabin wall; connecting a second external connector of a second external branch connected to the first external connector to the external machine connector of the excavator; and connecting a third external connector of a third external branch of the external wiring harness to the tiltrotator wiring connector.

In Example 18, the subject matter of Example 17 optionally includes installing a tiltrotator electrical machine controller on the excavator; and disconnecting an existing internal machine connector from the connector block on an inside cabin wall of the excavator.

In Example 19, the subject matter of any one or more of Examples 17-18 optionally include connecting the tilt rotator electrical machine controller to an internal wiring harness; and installing a new joystick assembly within the cabin comprising a first joystick and a second joystick and connecting the first joystick and the second joystick to the internal wiring harness.

In Example 20, the subject matter of any one or more of Examples 17-19 optionally include connecting the internal wiring harness to the connector block on the inside cabin wall of the excavator and to the internal machine connector.

In Example 21, the systems, devices, or methods of any one or any combination of Examples 1-20 can optionally be configured such that all elements or options recited are available to use or select from.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Excavators are relatively large pieces of equipment that can include a boom, stick, and bucket. In some excavators, an operator can use controls positioned within a cabin of the excavator to operate the boom, stick, and bucket to move dirt and/or other construction materials and debris. Some excavators can be modified to couple a tiltrotator to the bucket, which can provide additional degrees of freedom over a traditional bucket. However, in most cases, the existing excavators must be modified to add a tiltrotator. The modification process can require labor-intensive wiring, including terminating by hand, many wires for the power and control connections of the tiltrotator and the controls in communication therewith. Manual wiring can be costly and can be prone to errors.

This disclosure addresses these problems by providing a wiring harness that connects to existing wiring terminals and existing wiring harnesses within the cabin of the excavator and external to the cabin. The disclosed wiring harnesses may provide for reduced time and labor for installing a tiltrotator and/or when retrofitting a tiltrotator on an excavator.

Figure 1:
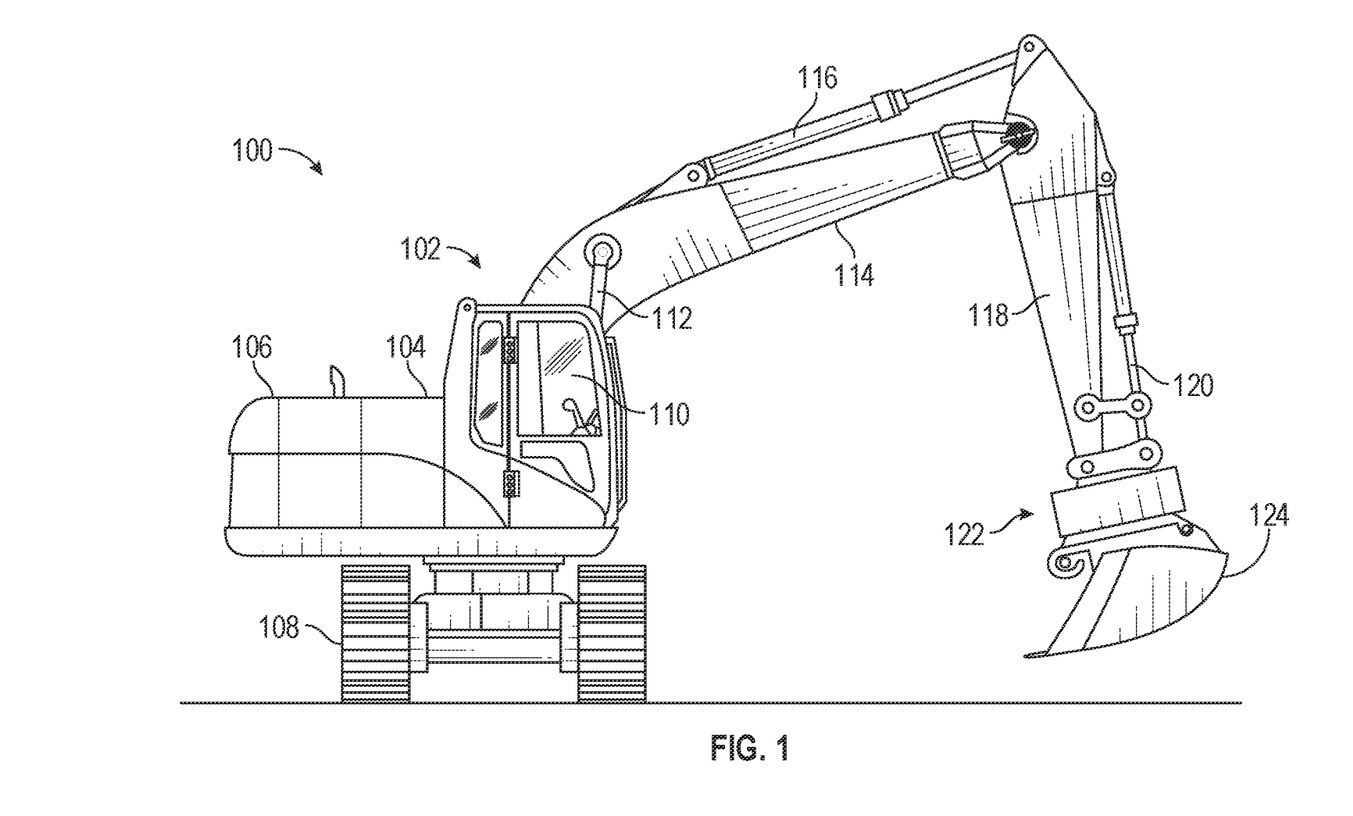
FIG. 1 is a perspective view of an excavator including a tiltrotator, in accordance with at least one example of the present disclosure.

FIG. 1 is a perspective view of an excavator 100 including a tiltrotator 122, in accordance with at least one example of the present disclosure. The excavator 100 can include a body 102, an engine 104, a pump 106, tracks 108, a cabin 110, a first hydraulic actuator 112, a boom 114, a second hydraulic actuator 116, a stick 118, a third hydraulic actuator 120, a tiltrotator 122, and a bucket 124.

The body 102 of the excavator 100 can be a chassis, frame, and exterior panels of the excavator 100 and can be configured to support and house various components of the excavator 100 such as the engine 104, the pump 106, the tracks 108, and the cabin 110.

The engine 104 can be a combustion, electric, or other type of motor configured to produce mechanical energy. The pump 106 can be a hydraulic pump connected to the engine 104 and can be powered thereby. In some examples, the pump 106 can be connected to one or more valves for controlling and distributing hydraulic fluid to various hydraulic actuators of the excavator 100, such as the first hydraulic actuator 112, the second hydraulic actuator 116, and the third hydraulic actuator 120. The tracks 108 can be a set of movable tracks powered by the engine 104 and connected to the body. The tracks can be operable by the engine 104 to move the excavator.

The cabin 110 can be connected to the body 102 and configured to enclose an operator therein. The cabin 110 can include various controls mounted therein for controlling the operation of, for example, the engine 104, the pump 106, the tracks 108, the boom 114, the stick 118, and the tiltrotator 122 (to control the bucket 124).

The boom 114 can be connected to the body 102 and the stick 118, and the stick 118 can further be connected to the tiltrotator 122. Each of the first hydraulic actuator 112, the second hydraulic actuator 116, and the third hydraulic actuator 120 can be connected to and powered by the pump 106, as noted above. The first hydraulic actuator 112 can be connected to the body 102 and the boom 114; the second hydraulic actuator 116 can be connected to the boom 114 and the stick 118; and, the third hydraulic actuator 120 can be connected to the stick 118 and the tilt rotator 122. The tiltrotator 122 can also be connected to the stick 118 and the bucket 124.

In operation of some examples, an operator can use the controls within the cabin 110 to move the excavator 108 using the tracks. The operator can further articulate the boom 114 and stick 118 to position the bucket relative to the body 102. The operator can use the controls to use the tiltrotator 122 to tilt, rotate, and scoop or curl the bucket 124 to perform various tasks, such as moving dirt and other materials during an excavating process.

Figure 2:
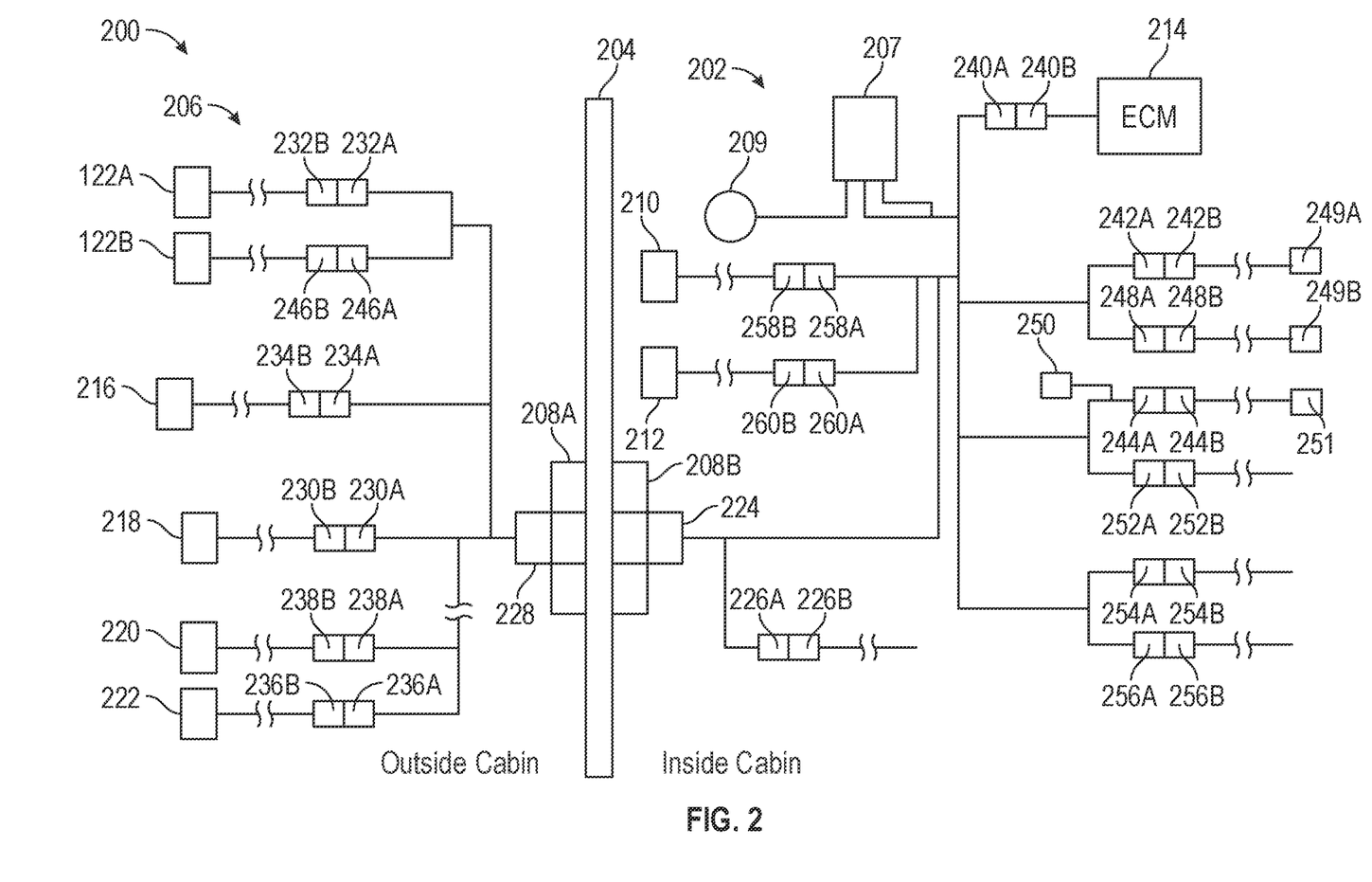
FIG. 2 is wiring schematic of a wiring assembly configured for use with an excavator, in accordance with at least one example of the present disclosure.

FIG. 2 is wiring schematic of a wiring assembly 200 configured for use with an excavator, in accordance with at least one example of the present disclosure. Wiring assembly 200 can include a first (or internal) wiring harness 202, a cabin wall 204, a second (or external) wiring harness 206, a tiltrotator 122A and 122B (collectively referred to as the tiltrotator 122), a relay 207, a connector block 208A and 208B (collectively referred to as the connector block 208), a power source 209, a controller area network (CAN) connector 210, a universal serial bus device (USB device) 212, an electronic machine controller (ECM) 214, an electronic control unit 216, an external machine component 218, and a quick coupler valve 220 and 222. The first wiring harness 202 can include a first connector 224, and a second connector 226A. The second wiring harness 206 can include a third connector 228, a fourth connector 230A, a fifth connector 232A, a sixth connector 234A, a seventh connector 236A, and an eighth connector 238A. The first wiring harness 202 can further include a ninth connector 240A, a tenth connector 242A, and an eleventh connector 244A. The second wiring harness can further include a second tiltrotator connector 246A. The first wiring harness 202 can further include a second tiltrotator control connector 248A, a tiltrotator steering device 249, a second shut-off lever connector 250, a shut-off lever 251, a third tiltrotator control connector 252A, a coupler switch connector 254A, a terminal connector 256A, a CAN connector 260A, and a USB connector 260B.

Each of the connectors of the first wiring harness 202 and the second wiring harness 206 (denoted by A) can be couplable to a companion connector for the component to which each connector connects (denoted by B). For example, the ninth connector 240A can connect to connector 240B of the ECM 214.

Each of the first (or internal) wiring harness 202 and the second (or external) wiring harness 206 can be wiring harnesses configured to connect various electrical components using wiring. Each wire of each of the first wiring harness 202 and the second wiring harness 206 can be a low voltage conduit, such as a control wire, or a high voltage conduit, such as a power wire. Each wire of each of the first wiring harness 202 and the second wiring harness 206 can be a shielded or unshielded electrical or optical wire. Wires of each of the first wiring harness 202 and the second wiring harness 206 can be bundled and coupled to individual connectors to allow for branches to be quickly connected to other branches or to component connects, as discussed in further detail below.

The cabin wall 204 can be a physical wall of a cabin of an excavator such as cabin 110 of excavator 100 of FIG. 1. In some examples, the cabin wall 204 can separate the inside of the cabin 110 from an outside environment. The connector block can be mounted on the cabin wall 204 where the internal connector block 208A can be on an internal side of the cabin wall 204 and the external connector block 208B can be on an external side of the cabin wall 204. In some example, the connector block 208 can be a single component or assembly with connectors on either side of the cabin wall 204. In other examples, the connector block 208 can be multiple components connected together through the cabin wall 204.

The tiltrotator 122 can be a tiltrotator connected to a bucket and a stick, such as the tiltrotator 122 of FIG. 1. In some examples, the tiltrotator 122 can include multiple connectors (such as connector 232B and 246B), which can be connected to one or more of the tiltrotator devices such as the fifth connector 232B, and the second tiltrotator connector 246B.

The power source 209 can be connected to the wiring harness 202 via the relay 207, which can selectively control the flow of power to the first wiring harness 202 or to various branches of the first wiring harness 202. The CAN connector 210 can be a connector configured to connect the first harness 202 to a CAN network, such as via a CAN bus. The USB device 212 can be any device configured to connect to a USB interface.

Each of the electronic machine controller (ECM) 214 and the electronic control unit (ECU) 216 can be a programable controller, such as a single or multi-board computer, a direct digital controller (DDC), or a programable logic controller (PLC). In other examples the ECM 214 and the ECU 216 can be any computing device that includes a processor and communication capabilities. Each of the (ECM) 214 and the ECU 216 can be configured to perform operations using information received form the components connected to the first and second wiring harnesses 202 and 206, respectively, and can be configured to transmit information thereto. In one example, the ninth connector 240A can be configured to connect to an ECM connector 240B to connect the ECM 214 to the first wiring harness. Similarly, the sixth connector 234A can be configured to connect to an ECU connector 234B to connect the ECU 216 to the second wiring harness 206.

The external machine component 218 can be any external component of an excavator or other piece of equipment. The external machine component 218 can be configured to connect to the fourth connector 230A via a machine component connector 230B.

The quick coupler valve 220 and 222 can be a valve for controlling the flow of hydraulic fluid. The quick coupler valve 220 and 222 can be connected to the seventh connector 236A and the eighth connector 238A via quick coupler connectors 238B and 236B, respectively.

The first connector 224 can be a connector, such as a multi-pole connector configured to couple multiple wires to another connector. In some examples, the first connector 224 can be a 12-pole connector. In some examples, the first connector 224 can connect to the connector block 208B to connect the first wiring harness 202 to the third connector 228 via the connector block 208A through the cabin wall 204. Similarly, the third connector 228 can be a connector, such as a multi-pole connector configured to couple multiple wires to another connector. In some examples, the third connector 228 can be a 12-pole connector. In some examples, the third connector 228 can connect to the connector block 208A to connect the second wiring harness 206 to the first connector 224 via the connector block 208B through the cabin wall 204.

The second connector 226A can be configured to connect to the existing machine connector 226B, which can be internal to the cabin and can be previously connected to the connector block 208B. That is, the first connector 224 can have substantially the same connector type as the existing machine connector 226B and the second connector 226A can have a complementary connector to the existing machine connector 226B.

Similarly, the fourth connector 230A can connect to the external machine connector 230B (of the external machine component 218), where the external machine connector can be previously connected to the connector block 208A. That is, the second connector 228 can have substantially the same connector type as the existing machine connector 230B and the fourth connector 230A can have a complementary connector to the existing machine connector 238B. These connectors can allow the first and second wiring harnesses 202 and 206, respectively, to be quickly connected to the existing connector block 208 and to the existing machine connectors 226B and 230B, respectively, which can allow for the first and second wiring harnesses 102 and 106, respectively, to be relatively quickly installed, which can help reduce wiring labor required for installing the components of the tiltrotator 100.

As noted above, the fifth connector 232A can be configured to connect to a tiltrotator connector 232B to connect the tiltrotator 100 to the second wiring harness 206. Similarly, the second tiltrotator connector 246A can be configured to connect to a tiltrotator connector 246B to connect the tiltrotator 100 to the second wiring harness 206.

The tenth connector 242A and the eleventh connector 244A can be configured to connect to steering components of the tiltrotator, such as one or more joysticks. Accordingly, the tenth connector 242A and the eleventh connector 244A can connect to steering control connectors 242B and 244B respectively to connect the steering components to the second wiring harness 206.

In one example, each of the tenth connector 242A and the second tiltrotator control connector 248A can connect to the tiltrotator steering device 249 via a steering connector 242B and 248B, respectively. The tiltrotator steering device 249 can be a joystick, steering wheel, knob, and the like, configured to control or operate movement of the tiltrotator. In some examples, the tiltrotator steering device 249 can be a first joystick 249A and a second joystick 249B.

Figure 3:
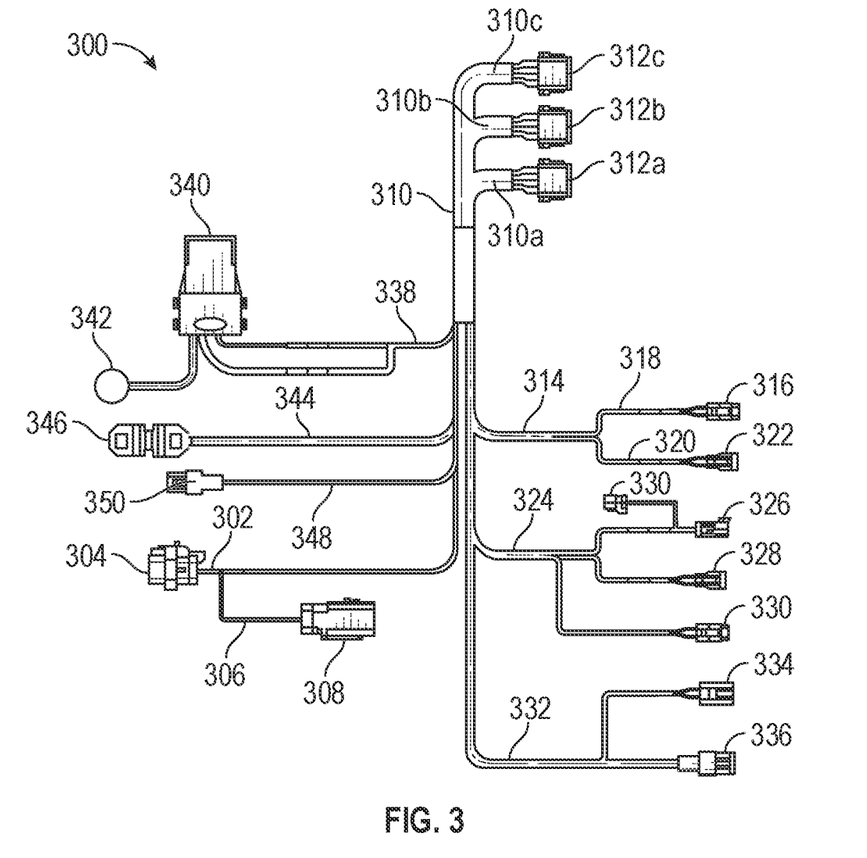
FIG. 3 is schematic view of a wiring harnesses configured for use with an excavator, in accordance with at least one example of the present disclosure.

FIG. 3 is schematic view of a wiring harnesses 300 configured for use with an excavator, in accordance with at least one example of the present disclosure. The wiring harness 300 can include a first branch 302, a first connector 304, a second branch 306, a second connector 308, a ninth branch 310A, 310B, and 310C (collectively referred to as the ninth branch 310), ninth connectors 312A, 312B, and 312C (collectively referred to as the ninth connectors 312), a tenth branch 314, a tenth connector 316, tenth sub-branches 318 and 320, a second steering connector 322, an eleventh branch 324, an eleventh connector 326, a third steering connector 328, a fourth steering connector 330, a coupler branch 332, a coupler connector 334, a terminal connector 336, a relay branch 338, a relay 340, a power source 342, a CAN branch 344, a CAN connector 346, a USB branch 348, and a USB connector 350.

The first wiring harness 302 can be similar to the first wiring harness 202 of FIG. 2, except that FIG. 3 shows additional details and components of the wiring harness 302. For example, FIG. 3 shows how the connectors of the first wiring harness connect via the branches of the wiring harness.

For example, the first branch 302 can be connected to the first connector 304 and the second branch 306, which can connect to the second connector. In some examples, the first connector 304 can be a male connector configured to connect to a connector block, such as the connector block 208 of FIG. 2. The second connector 308 can be configured to connect to an existing machine connector, as discussed in FIG. 2 above and FIG. 4 below.

Each of the ninth branches 310A, 310B, and 310C can include respective ninth connectors 312A, 312B, and 312C, which can be configured to connect to an ECM, such as ECM 214 via ECM connector 240B. The tenth branch 314 can connect to the first branch 302 (or to one of the ECM connectors 312A-312C) and to the tenth connector 316, which can connect to a tiltrotator steering device. The tenth sub-branches 318 and 320 can respectively connect to the tenth connector 316 and the second steering connector 322, respectively, and can both connect to the tenth branch 314. The eleventh branch 324 can connect to the first branch 302 (or to one of the ECM connectors 312A-312C) and to the eleventh connector 326, which can connect to a shut off lever. The eleventh branch 324 can also connect to the third steering connector 328 and the fourth steering connector 330.

The coupler branch 332 can connect to the first branch 302 (or to one of the ECM connectors 312A-312C) and can connect to the coupler connector 334 and the terminal connector 336. The relay branch 338 can connect to the first branch 302 (or to one of the ECM connectors 312A-312C) and to the relay 340, which can connect to the power source 342. The CAN branch 344 can connect to the first branch 302 (or to one of the ECM connectors 312A-312C) and to the CAN connector 346. The USB branch 348 can connect to the first branch 302 (or to one of the ECM connectors 312A-312C) and can connect to the USB connector 350.

Figure 4:
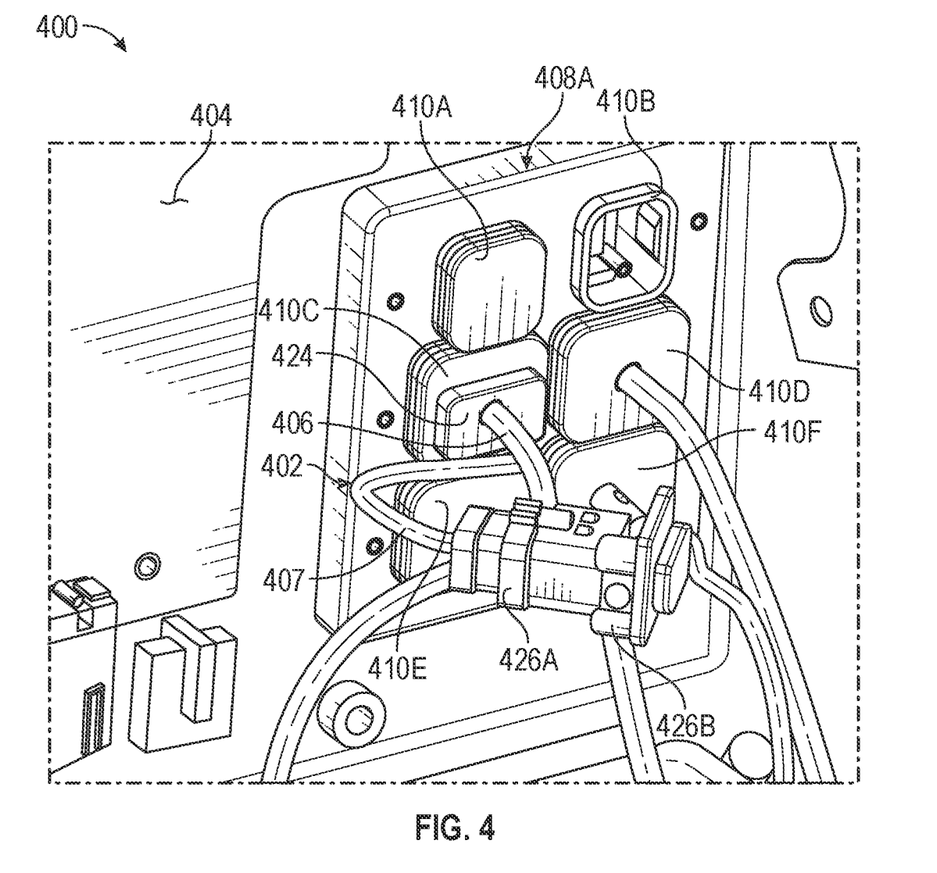
FIG. 4 is an isometric view of a portion of a wiring assembly, in accordance with at least one example of the present disclosure.

FIG. 4 is an isometric view of a portion of a wiring assembly 400, in accordance with at least one example of the present disclosure. The wiring assembly 400 can include a first wiring harness 402, a cabin wall 404, a first branch 406, a second branch 407, a connector block 408A (including connectors 410A-410F), a first connector 424, a second connector 426A, and an internal machine connector 426B.

The first wiring assembly 400 can be consistent with the components of FIGS. 2 and 3, except that FIG. 4 shows additional details and components of the wiring assembly 400. For example, FIG. 4 shows how the existing internal machine connector 426B can be disconnected from the connector 410C of the connector block 408 on the cabin wall 404 and shows how the first connector 424 can connect to the connector 410C of the connector block 408. FIG. 4 further shows that the second connector 426A can connect to the existing external machine connector 426B. This can allow the first wiring harness 402 to be quickly and easily added to the wiring assembly 400 of an existing excavator.

Figure 5:
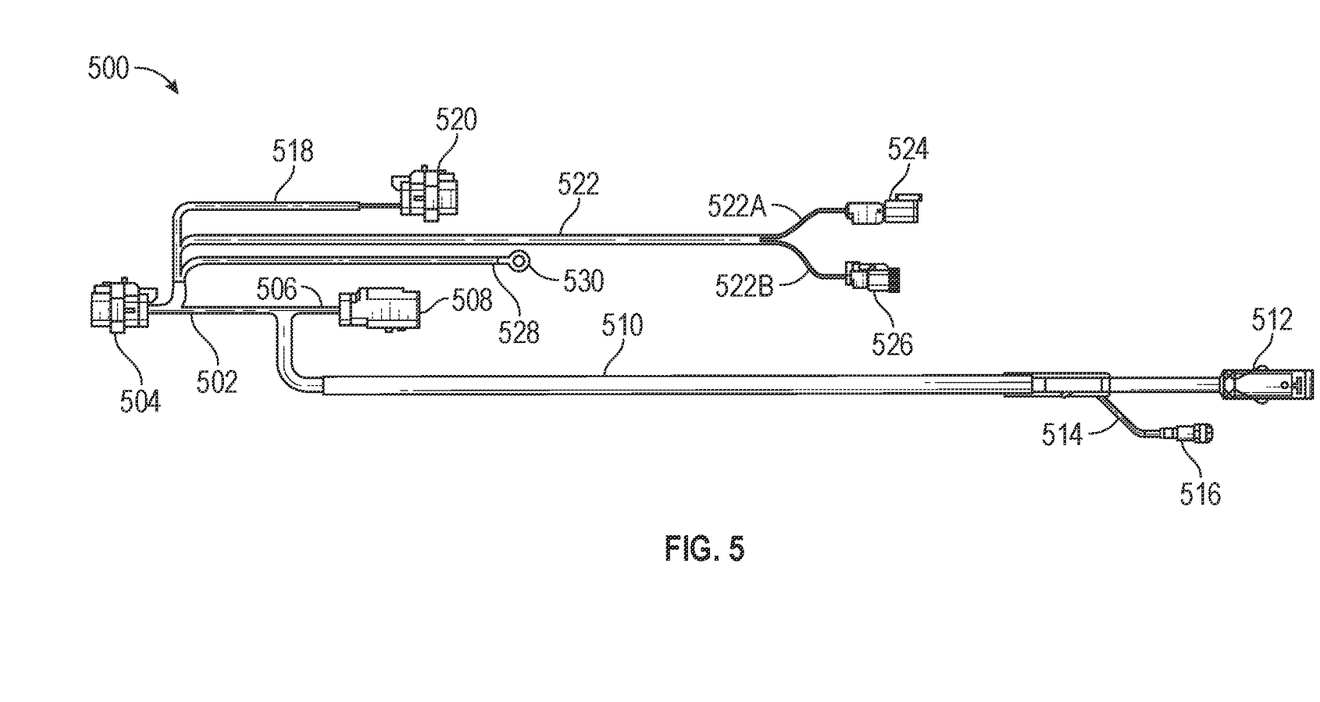
FIG. 5 is schematic view of a wiring harnesses configured for use with an excavator, in accordance with at least one example of the present disclosure.

FIG. 5 is schematic view of a second wiring harnesses 500 configured for use with an excavator, in accordance with at least one example of the present disclosure.

The second wiring harnesses 500 can include a third branch 502, a third connector 504, a fourth branch 506, a fourth connector 508, a fifth branch 510, a fifth connector 512, a second tiltrotator branch 514, a second tiltrotator connector 516, a sixth branch 518, a sixth connector 520, a seventh branch 522A, an eighth branch 522B, a seventh connector 524, an eighth connector 526, a ground branch 528, and a ground connector 530.

The second wiring harness 506 can be similar to the second wiring harness 206 of FIG. 2, except that FIG. 5 shows additional details and components of the second wiring harness 506. For example, FIG. 5 shows how the third branch 502 connects to the third connector 504 and to the fourth branch 506, which can connect to the fourth connector 508. The third connector 504 can be, as shown in FIG. 5, a male connector configured to connect to a connector block and the fourth connector 508 can be a female connector configured to connect to an existing external machine connector, as shown in FIG. 6 below.

FIG. 5 also shows that the fifth branch 506 can connect to the first connector 504 and/or the second connector 508 via the first branch 502 and/or the second branch 506. The fifth branch 506 can further connect to the fifth connector 512 and can connect to the second tiltrotator branch 514, which can connect to the second tiltrotator connector 516.

FIG. 5 also shows that the sixth branch 518 can connect to the first connector 504 and can connect to the sixth connector 520. The seventh branch 522A and the eighth branch 522B can each connect to the first connector 504 and can individually connect to the seventh connector 524 and the eighth connector 526, respectively. The ground branch 528 can connect to the first connector 504 and to the ground connector 530.

Figure 6:
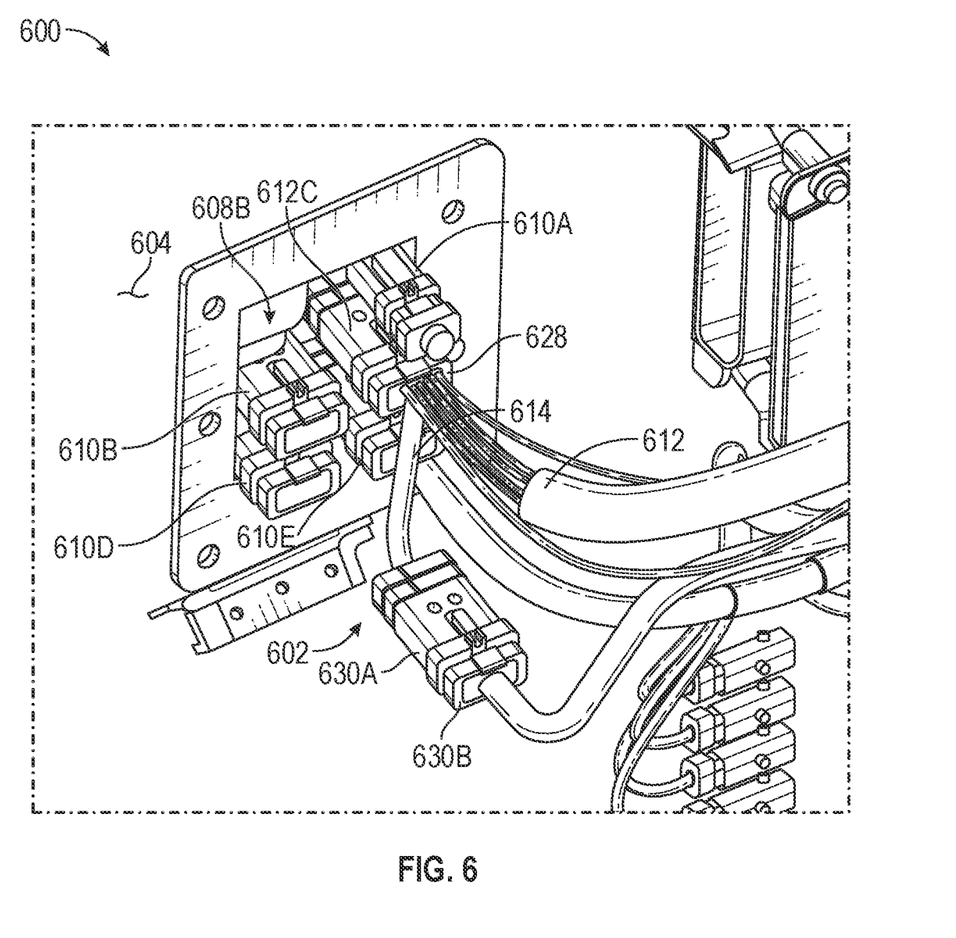
FIG. 6 is an isometric view of a portion of a wiring assembly, in accordance with at least one example of the present disclosure.

FIG. 6 is an isometric view of a portion of a second wiring assembly 600, in accordance with at least one example of the present disclosure. The wiring assembly 600 can include a second wiring harness 602, a cabin wall (external) 604, a connector block 608 (including connectors 610A-610E), a third branch 612, a fourth branch 614, a third connector 628, a fourth connector 630A, and an external machine connector 630B.

The second wiring assembly 600 can be consistent with the components of FIGS. 2 and 5, except that FIG. 6 shows additional details and components of the wiring assembly 600. For example, FIG. 6 shows how the existing external machine connector 630B can be disconnected from the connector 610C of the connector block 608 on the cabin wall 604. FIG. 6 also shows how the third connector 628 can connect to the connector 610C of the connector block 608 and how the fourth connector 430A can connect to the existing external machine connector 430B. This can allow the second wiring harness 602 to be quickly and easily added to the wiring assembly 600 of an existing excavator.

Figure 7:
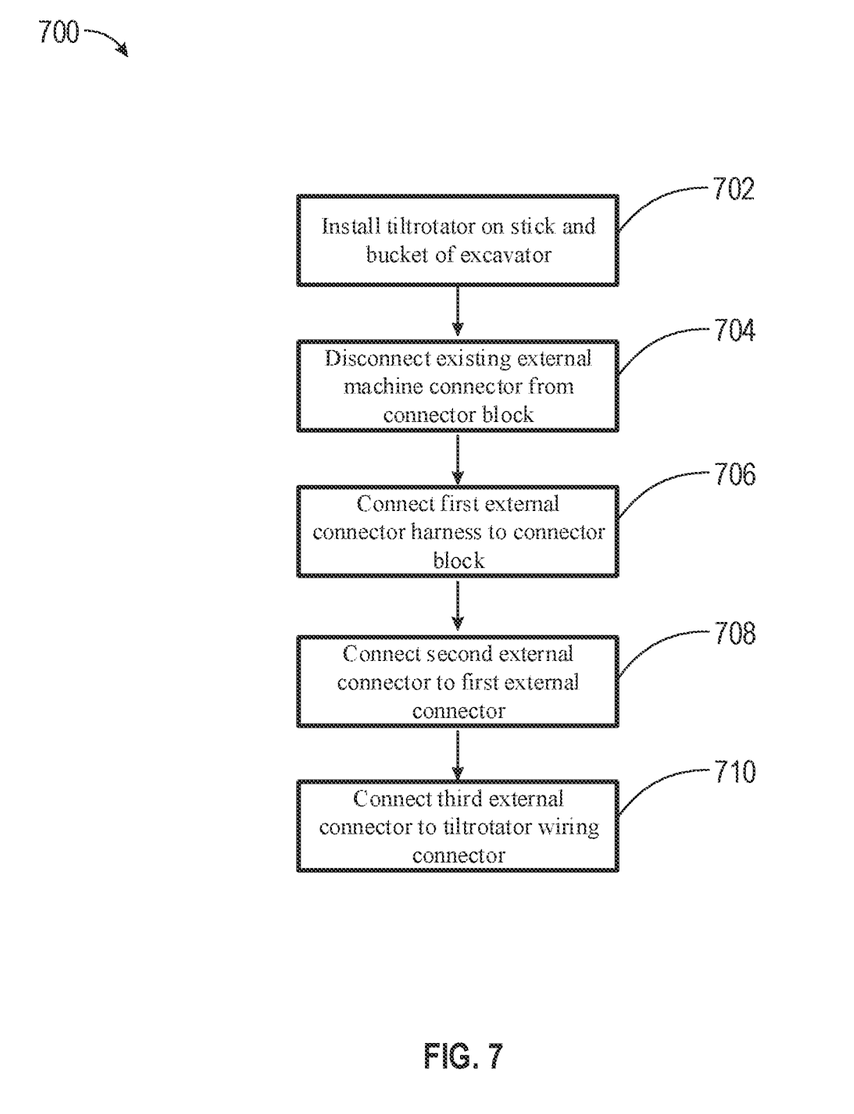
FIG. 7 is a schematic view of a method, in accordance with at least one example of the present disclosure.

FIG. 7 is a schematic view of a method 700, in accordance with at least one example of the present disclosure. Method 700 can be a method or process for removing and/or replacing a wiring assembly. FIG. 7 shows a flow chart of using the devices and systems described above, in accordance with at least one example of this disclosure. The steps or operations of the method of FIG. 7 are illustrated in a particular order for convenience and clarity. Many of the discussed operations can be performed in a different sequence or in parallel, and some operations may be excluded, without materially impacting other operations.

The method of FIG. 7, as discussed, includes operations that may be performed by multiple different actors, devices, and/or systems. It is understood that subsets of the operations discussed in the method of FIG. 7 that are attributable to a single actor, device, or system could be considered a separate standalone process or method.

In some examples, method 700 can be a method of retrofitting an excavator to add a tiltrotator. Method 700 can begin at step 702, where a tiltrotator can be installed on a stick and a bucket of the excavator, where the tiltrotator can include a tiltrotator wiring connector. For example, the tiltrotator 122 can be installed on the stick 118 and the bucket 124 of the excavator 100, where the tiltrotator 122 can include the tiltrotator wiring connector 232B (and in some examples 246B).

At step 704, an existing external machine connector can be disconnected from a connector block on an outside cabin wall of the excavator. For example, the existing external machine connector 230B can be disconnected from the connector block 208A on an outside cabin wall 204 of the excavator 100.

At step 706, a first external connector of a first branch of an external wiring harness can be connected to the connector block on the outside of the cabin wall. For example, the first external connector 504 of the first branch 502 of the external wiring harness 500 can be connected to the connector block 608 on the outside of the cabin wall 604.

At step 708, a second external connector of a second branch connected to the first external connector can be connected to the external machine connector of the excavator. For example, the second external connector 508 of the second branch 506 connected to the first external connector 504 can be connected to the external machine connector 530B of the excavator 100.

At step 710, a third external connector of a third external branch of the external wiring harness can be connected to the tiltrotator wiring connector. For example, the third external connector 512 of the third external branch 210 of the external wiring harness 500 can be connected to the tiltrotator wiring connector 122A.

In another example, a tiltrotator electrical machine controller can be installed on the excavator. For example, the tiltrotator electrical machine controller 214 can be installed on the excavator 100. In another example, an existing joystick and an existing joystick wiring harness can be disconnected and removed. In another example, a tiltrotator monitor can be installed on the excavator. In another example, an existing control wiring harness can be disconnected from an internal machine connector.

In another example, an existing internal machine connector can be disconnected from the connector block on an inside cabin wall of the excavator. In another example, the tiltrotator electrical machine controller can be connected to an internal wiring harness.

In another example, a new joystick assembly comprising a first joystick and a second joystick can be installed within the cabin. The first joystick and the second joystick can be connected to the internal wiring harness.

In another example, the internal wiring harness can be connected to the connector block on the inside cabin wall of the excavator and to the internal machine connector.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

INDUSTRIAL APPLICABILITY

The disclosed wiring devices may be applicable to any excavator, backhoe, or bucket device that can be modified to include a tiltrotator. The disclosed wiring harnesses may provide for reduced time and labor for installing a tiltrotator and/or when retrofitting a tiltrotator on an existing piece of equipment, such as an excavator.

Features of the disclosed wiring assembly provide an ability to connect existing wiring terminals and existing wiring harnesses to a new wiring harness within the cabin of the excavator and external to the cabin to connect the tiltrotator and the control devices to support the tiltrotator to each other and to existing controls and equipment of the existing excavator without requiring hand-termination or wires, which can save significant labor in wiring the components of the tiltrotator.

What is claimed is:

1. A method of retrofitting an excavator to add a tiltrotator, the method comprising:
installing a tiltrotator on a stick and a bucket of the excavator, the tiltrotator including a tiltrotator wiring connector;
disconnecting an existing machine connector from a first connector block on an outside of a cabin wall of the excavator;
connecting a first external connector of a first external branch of an external wiring harness to the first connector block on the outside of the cabin wall;
connecting a second external connector of a second external branch of the external wiring harness to an external machine connector of the excavator, the second external branch being connected to the first external branch; and
connecting a third external connector of a third external branch of the external wiring harness to the tiltrotator wiring connector.

2. The method of claim 1, further comprising:
disconnecting an existing internal machine connector from a second connector block on an inside of the cabin wall of the excavator, and
installing a tiltrotator electrical machine controller on the excavator.

3. The method of claim 2, further comprising:
connecting the tiltrotator electrical machine controller to an internal wiring harness.

4. The method of claim 3, further comprising:
connecting the internal wiring harness to the second connector block.

5. The method of claim 3, further comprising:
installing a joystick assembly within the cabin wall; and
connecting the joystick assembly to the internal wiring harness.

6. The method of claim 5, wherein the joystick assembly includes a first joystick and a second joystick.

7. The method of claim 5, further comprising:
connecting the external wiring harness to a quick coupler valve.

8. The method of claim 5, further comprising:
connecting the internal wiring harness to a shut-off lever.

9. The method of claim 1, wherein the first external connector is a male multi-pole connector and the second external connector is a female multi-pole connector.

10. The method of claim 1, wherein the third external connector is a male multi-pole connector.

11. A method of retrofitting an excavator by adding a tiltrotator to a stick and bucket of the excavator, the method comprising:
installing the tiltrotator on the stick and the bucket, the tiltrotator including a tiltrotator wiring connector;
connecting a first external connector of an external wiring harness to a first connector block on an outside of a cabin wall of the excavator,
connecting a second external connector of the external wiring harness to an external machine connector of the excavator; and
connecting a third external connector of a third external branch of the external wiring harness to the tiltrotator wiring connector.

12. The method of claim 11, further comprising:
disconnecting an existing internal machine connector from a second connector block on an inside of the cabin wall of the excavator; and
installing a tiltrotator electrical machine controller on the excavator.

13. The method of claim 12, further comprising:
connecting the tiltrotator electrical machine controller to an internal wiring harness.

14. The method of claim 13, further comprising:
connecting the internal wiring harness to the second connector block.

15. The method of claim 13, further comprising:
installing a first joystick and a second joystick within the cabin wall.

16. The method of claim 15, further comprising:
connecting the first joystick and the second joystick to the internal wiring harness.

17. The method of claim 15, further comprising:
connecting the external wiring harness to a quick coupler valve.

18. The method of claim 15, further comprising:
connecting the internal wiring harness to a shut-off lever.

19. The method of claim 11, further comprising:
disconnecting an existing external machine connector from the first connector block.

20. The method of claim 11, wherein the first external connector is a male multi-pole connector and the second external connector is a female multi-pole connector, and wherein the third external connector is a male multi-pole connector.

* * * * *